United States Patent
Youn et al.

(10) Patent No.: US 12,367,140 B2
(45) Date of Patent: Jul. 22, 2025

(54) METHOD AND APPARATUS FOR ALLOCATING MEMORY ADDRESSES IN RESOURCE-CENTRIC NETWORKS

(71) Applicant: ELECTRONICS AND TELECOMMUNICATIONS RESEARCH INSTITUTE, Daejeon (KR)

(72) Inventors: Ji Wook Youn, Daejeon (KR); Jongtae Song, Daejeon (KR); Kyeong-Eun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 25 days.

(21) Appl. No.: 17/952,537

(22) Filed: Sep. 26, 2022

(65) Prior Publication Data
US 2023/0153239 A1 May 18, 2023

(30) Foreign Application Priority Data
Nov. 15, 2021 (KR) .................. 10-2021-0156673

(51) Int. Cl.
*G06F 12/06* (2006.01)
(52) U.S. Cl.
CPC ...... *G06F 12/06* (2013.01); *G06F 2212/1048* (2013.01)
(58) Field of Classification Search
CPC .................. G06F 12/06; G06F 2212/1048
See application file for complete search history.

(56) References Cited

U.S. PATENT DOCUMENTS

| | | |
|---|---|---|
| 9,501,394 B2 | 11/2016 | Koh et al. |
| 10,409,509 B2 | 9/2019 | Bivens et al. |
| 10,691,531 B2* | 6/2020 | Singhai ............. G11C 29/028 |
| 11,283,708 B1* | 3/2022 | Troup .................. H04L 67/10 |
| 2014/0032507 A1* | 1/2014 | Voigt .................. G06F 3/067 |
| | | 707/E17.002 |
| 2015/0220430 A1 | 8/2015 | Kim |
| 2016/0283114 A1* | 9/2016 | Kimura ............. G06F 13/4022 |
| 2017/0316018 A1* | 11/2017 | Guo .................... H04L 43/0811 |
| 2019/0286567 A1* | 9/2019 | Chaudhuri ......... G06F 12/0804 |
| 2020/0042470 A1* | 2/2020 | Lee .................... G06F 13/4282 |
| 2020/0211264 A1* | 7/2020 | Janus .................. G06T 15/005 |
| 2021/0117114 A1 | 4/2021 | Cho |

(Continued)

FOREIGN PATENT DOCUMENTS

KR 10-2209452 B1 1/2021

*Primary Examiner* — Nanci N Wong
(74) *Attorney, Agent, or Firm* — LRK PATENT LAW FIRM

(57) ABSTRACT

A method and apparatus for allocating a memory address in a resource-centric network are disclosed. The method of allocating a memory address may include receiving a request for a new service, determining whether the new service is able to be accommodated in a virtual memory that is pre-allocated in a resource-centric network, when the new service is able to be accommodated, allocating a memory area for accommodating the new service to the virtual memory, and when the new service is not able to be accommodated, allocating the memory area by using an additionally allocated area of a virtual memory of the resource-centric network.

14 Claims, 14 Drawing Sheets

(56) References Cited

U.S. PATENT DOCUMENTS

2022/0244727 A1* 8/2022 Bojarski .................. G06N 3/08
2023/0028627 A1* 1/2023 Bhardwaj ............. G06F 3/0659
2023/0412762 A1* 12/2023 Goldstein ................ H04N 7/15

* cited by examiner

METHOD AND APPARATUS FOR ALLOCATING MEMORY ADDRESSES IN RESOURCE-CENTRIC NETWORKS

CROSS-REFERENCE TO RELATED APPLICATION

This application claims the benefit of Korean Patent Application No. 10-2021-0156673 filed on Nov. 15, 2021, in the Korean Intellectual Property Office, the entire disclosure of which is incorporated herein by reference for all purposes.

BACKGROUND

1. Field of the Invention

One or more example embodiments relate to a method and apparatus for allocating and managing a memory address when the size of an input/output (I/O) device changes in real-time in a resource-centric network to which a computing device and the I/O device are connected via an interconnection interface.

2. Description of Related Art

Recently, a data center internal network has been developed based on a server-centric network. In a server-centric network, a plurality of servers configured in a central processing unit (CPU) for a computing function, a graphics processing unit (GPU) optimized for parallel processing operations, and a memory is connected to a data center network.

Since the server-centric network is in a server configured with hardware including a CPU, a GPU, and a memory, the server-centric network has the advantage of easy hardware implementation and easy connection between devices. However, because of commercialization of 5G service and emergence of related services, a data center internal traffic characteristic has rapidly changed to a memory-centric service or a computing-centric service. In this traffic environment, extremely asymmetric utilization of network resources (e.g., a CPU, a memory, etc.) for each application occurs since some applications use almost all CPU resources or memory resources.

For example, in case of providing a computing-centric service, more than 95% of CPU processing power in the server may be used while less than 10% of total capacity of a memory is used. Conversely, in case of providing a memory-centric service, more than 95% of a memory in the server may be used while less than 5% of CPU processing power is used. Therefore, there is a limit that even though sufficient network resources are left, the resources are not available to accommodate other services.

Accordingly, there is a demand for sharing a plurality of computing devices (e.g., a CPU, a GPU, etc.) and a plurality of I/O devices (e.g., a memory, a storage, etc.).

SUMMARY

Example embodiments provide a method and apparatus for sharing an input/output (I/O) device with a plurality of computing devices by operating a plurality of I/O device as one large network virtual I/O device in a resource-centric network to which a plurality of computing devices (e.g., a central processing unit (CPU), a graphics processing unit (GPU), etc.) and a plurality of I/O devices (e.g., a memory, a storage) are connected to each other via an interconnection interface.

In addition, example embodiments provide a method and apparatus for sharing a memory pool without crashing between a plurality of CPUs by allocating and managing an added or deleted memory to a network virtual memory area when memories constituting the memory pool in a resource-centric network structure in which the plurality of CPUs shares the memory pool are added or deleted.

In addition, example embodiments provide a method and apparatus for enabling a plurality of CPUs to perform byte-access to a memory pool by managing a network virtual memory area for each memory group by a plurality of CPUs using an individual offset value.

According to an aspect, there is provided a method of allocating a memory address, the method including receiving a request for a new service, determining whether the new service is able to be accommodated in a virtual memory that is pre-allocated in a resource-centric network, when the new service is able to be accommodated, allocating a memory area for accommodating the new service to the virtual memory, and when the new service is not able to be accommodated, allocating the memory area by using an additionally allocated area of a virtual memory of the resource-centric network.

The allocating of the memory area for accommodating the new service may include among memories corresponding to the virtual memory that is pre-allocated, determining whether an available memory that may allocate the memory area is connected to an optical link, and when the available memory is connected to the optical link, allocating the memory area to the available memory and transmitting memory information changed based on allocation of the memory area.

The determining of whether the available memory is connected to an optical link may include, when the capacity of the optical link connected to the available memory is not sufficient to accommodate the new service, determining that the available memory is not connected to the optical link.

The allocating of the memory area for accommodating the new service may include, when the available memory is not connected to the optical link, setting a new optical link to an available memory that may allocate the memory area among memories corresponding to the virtual memory that is pre-allocated, and allocating the memory area to the available memory to which the new optical link is set and transmitting the new optical link and memory information changed based on allocation of the memory area.

The allocating of the memory area for accommodating the new service may further include, when the new optical link to the available memory fails to be set, transmitting a new service accommodation error signal.

The allocating of the memory area by using the additionally allocated area may include determining whether the new service is able to be accommodated by using the additionally allocated area, when the new service is not able to be accommodated by using the additionally allocated area, transmitting a new service accommodation error signal, when the new service is able to be accommodated by using the additionally allocated area, determining whether an available memory that may allocate the memory area among memories corresponding to the additionally allocated area is connected to an optical link, and when the available memory is connected to the optical link, allocating the memory area in the available memory and transmitting memory information changed based on allocation of the memory area.

The allocating of the memory area by using the additionally allocated area further may include, when the available memory is not connected to the optical link, setting a new optical link to an available memory that may allocate the memory area among memories corresponding to the additionally allocated area, and allocating the memory area to the available memory to which the new optical link is set and transmitting the new optical link and memory information changed based on allocation of the memory area.

The allocating of the memory area by using the additionally allocated area may further include, when the new optical link to the available memory fails to be set, transmitting a new service accommodation error signal.

According to an aspect, there is provided a method of changing a memory address, the method including receiving changed memory information from a memory pool of a resource-centric network, determining, from the changed memory information, whether a memory is added, when the memory is added, allocating an added memory to an additionally allocated area, when the memory is not added, identifying whether at least one of existing memories is deleted, and when the existing memory is deleted, deleting a memory corresponding to memory information from a virtual memory area.

The allocating to the additionally allocated area may include identifying a changed memory capacity and identification information of a memory group of which a memory capacity has changed, allocating the added memory to the additionally allocated area based on the changed memory capacity and the identification information of the memory group, and storing a starting address of the added memory and an added memory capacity.

The deleting of the memory may include identifying a deleted memory capacity and identification information of a memory group of which a memory capacity has changed, deleting a memory corresponding to memory information from a virtual memory area, based on the deleted memory capacity and the identification information of the memory group, and storing an ending address of the virtual memory and a remaining memory capacity after deletion of the memory The method may further include, when the memory is not added and the existing memory is not deleted, transmitting a memory change error signal.

According to an aspect, there is provided a memory address allocation apparatus including an input/output device configured to receive a request for a new service, and a processor configured to determine whether the new service is able to be accommodated in a virtual memory that is pre-allocated in a resource-centric network, allocate a memory area for accommodating the new service to the virtual memory, and allocate the memory area by using an additionally allocated area of a virtual memory of the resource-centric network when the new service is not able to be accommodated.

The processor may be configured to, among memories corresponding to the virtual memory that is pre-allocated, determine whether an available memory that may allocate the memory area is connected to an optical link, and when the available memory is connected to the optical link, allocate the memory area to the available memory and transmit memory information changed based on allocation of the memory area.

The processor may be further configured to, when the capacity of the optical link connected to the available memory is not sufficient to accommodate the new service, determine that the available memory is not connected to the optical link.

The processor may be further configured to when the available memory is not connected to the optical link, set a new optical link to an available memory that may allocate the memory area among memories corresponding to the virtual memory that is pre-allocated, allocate the memory area to the available memory to which the new optical link is set, and transmit the new optical link and memory information changed based on allocation of the memory area, and when the new optical link to the available memory fails to be set, transmit a new service accommodation error signal.

The processor may be configured to determine whether the new service is able to be accommodated by using the additionally allocated area and when the new service is not able to be accommodated by using the additionally allocated area, transmit a new service accommodation error signal, when the new service is able to be accommodated by using the additionally allocated area, determine whether an available memory that may allocate the memory area among memories corresponding to the additionally allocated area is connected to an optical link, and when the available memory is connected to the optical link, allocate the memory area to the available memory and transmit memory information changed based on allocation of the memory area.

The processor may be further configured to, when the available memory is not connected to the optical link, set a new optical link to an available memory that may allocate the memory area among memories corresponding to the additionally allocated area, allocate the memory area to the available memory to which the new optical link is set, and transmit the new optical link and memory information changed based on allocation of the memory area.

Additional aspects of example embodiments will be set forth in part in the description which follows and, in part, will be apparent from the description, or may be learned by practice of the disclosure.

According to one embodiment, a plurality of computing devices may share an input/output (I/O) device by operating the plurality of I/O devices as one large network virtual I/O device in a resource-centric network to which the plurality of computing devices (e.g., a CPU, a GPU) and the plurality of I/O devices (e.g., a memory, a storage) are connected to each other via the interconnection interface.

According to one embodiment, in the resource-centric network structure in which a plurality of CPUs shares a memory pool, when memories constituting the memory pool are added or deleted, the plurality of CPUs may share the memory pool without crashing by allocating the added or deleted memory to the network virtual memory area.

According to one embodiment, a plurality of CPUs may perform byte-access to the memory pool by allowing the plurality of CPUs to manage the network virtual memory area for each memory group by using an individual offset value.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. A method of allocating a memory address and a method of changing a memory address may be performed by a memory address allocation apparatus 160.

Figure 1:
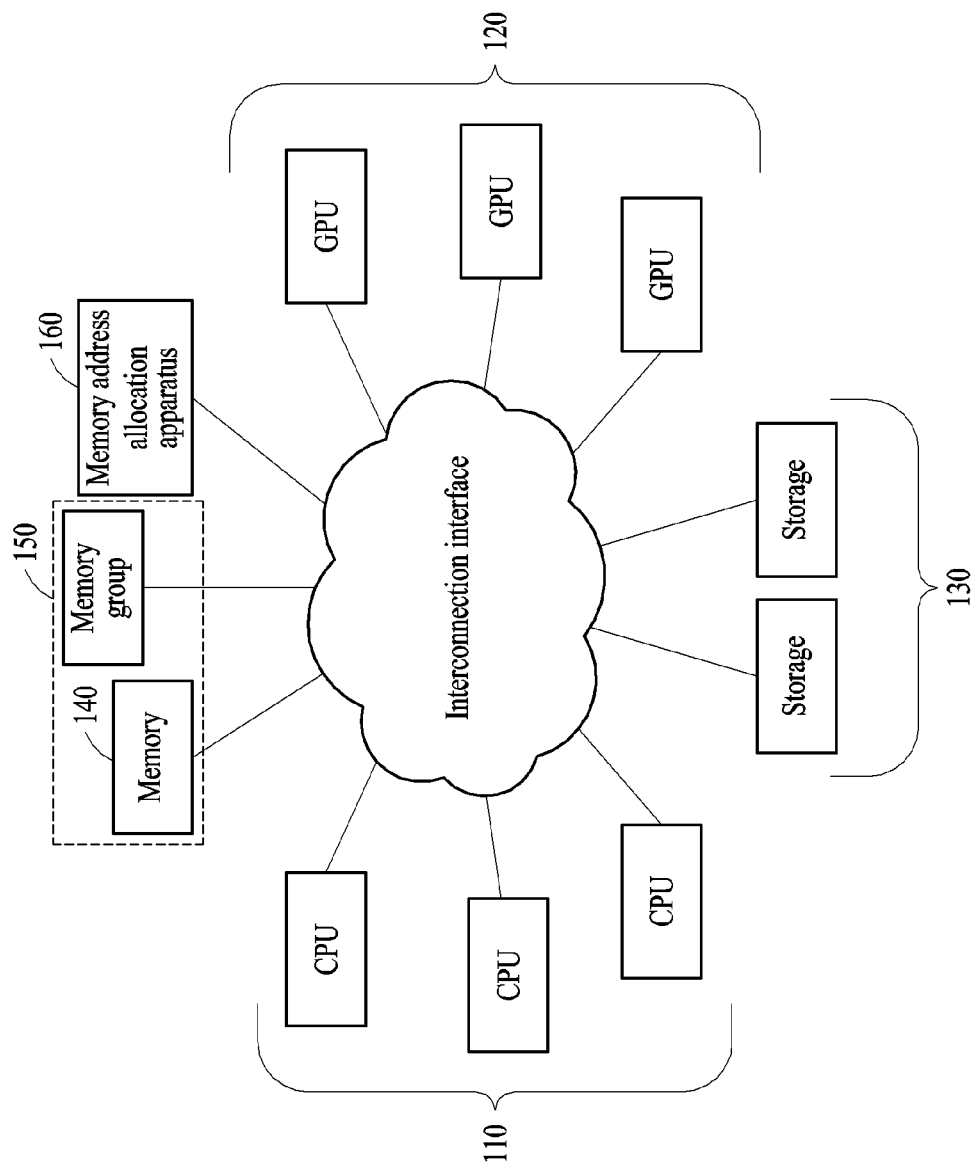
FIG. 1 is a diagram illustrating a resource-centric network according to one embodiment.

FIG. 1 is a diagram illustrating a resource-centric network according to one embodiment.

To efficiently accommodate a service that asymmetrically uses resources, in the resource-centric network as illustrated in FIG. 1, a central processing unit (CPU) 110, a graphics processing unit (GPU) 120, a memory 140, and a storage 130 may be individually included in the resource-centric network, not configured as one server, and may be connected to each other via an interconnection interface. For example, the interconnection interface may be configured with a conventional electrical switch, a predetermined protocol switch, or an optical switch.

In this case, in the resource-centric network, a plurality of memories 140 or a memory group may constitute a memory pool 150 and a plurality of CPUs 110 or a plurality of GPUs 120 may share the memory pool. The memory address allocation apparatus 160 may manage the memory pool in the form of a network virtual memory and may manage optical link connection of the resource-centric network based on the memory group.

An input/output (I/O) device of the memory address allocation apparatus 160 may receive a request for a new service from a user. In addition, a processor of the memory address allocation apparatus 160 may allocate a network virtual memory for accommodating the requested new service.

The memory address allocation apparatus 160 may determine whether the new service is able to be accommodated by a virtual memory that is pre-allocated in the memory pool of the resource-centric network.

When the new service is able to be accommodated, the memory address allocation apparatus 160 may allocate a memory area for accommodating the new service in the pre-allocated virtual memory.

The memory address allocation apparatus 160 may determine whether an available memory that may allocate the memory area among memories corresponding to the pre-allocated virtual memory is connected to an optical link. When the capacity of the available memory connected to the optical link is not sufficient to accommodate the new service, the memory address allocation apparatus 160 may determine that the available memory is not connected to the optical link.

When the available memory is connected to the optical link, the memory address allocation apparatus 160 may allocate a memory area to the available memory and may transmit memory information changed based on allocation of the memory area.

In addition, when the available memory is not connected to the optical link, the memory address allocation apparatus 160 may set a new optical link to an available memory, which may allocate the memory area, among the memories corresponding to the pre-allocated virtual memory. In case the new optical link to the available memory fails to be set, the memory address allocation apparatus 160 may transmit a new service accommodation error signal.

Then, the memory address allocation apparatus 160 may allocate the memory area to the available memory to which the new optical link is set and may transmit the new optical link and memory information changed based on allocation of the memory area.

On the other hand, in case accommodation of the new service is not available, the memory address allocation apparatus 160 may allocate the memory area by using an additionally allocated area of a virtual memory of the resource-centric network.

The memory address allocation apparatus 160 may determine whether the new service is able to be accommodated by using the additionally allocated area. In addition, in case the new service is not able to be accommodated by using the additionally allocated area, the memory address allocation apparatus 160 may transmit a new service accommodation error signal.

In addition, in case the new service is able to be accommodated by using the additional allocation area, the memory address allocation apparatus 160 may identify whether the available memory, which may allocate the memory area, among memories corresponding to the additionally allocated area is connected to the optical link.

When the available memory is connected to the optical link, the memory address allocation apparatus 160 may allocate the memory area to the available memory and may transmit memory information changed based on allocation of the memory area.

On the other hand, when the available memory is not connected to the optical link, the memory address allocation apparatus 160 may set a new optical link to an available memory, which may allocate the memory area, among the memories corresponding to the additionally allocated area. In case the new optical link to the available memory fails to be set, the memory address allocation apparatus 160 may transmit a new service accommodation error signal.

In addition, the memory address allocation apparatus 160 may allocate the memory area to the available memory to which the new optical link is set and may transmit the new optical link and the memory information changed based on allocation of the memory area.

In addition, when the capacity of the memory pool changes in operation of the resource-centric network, the memory address allocation apparatus 160 may change a network virtual memory address.

The memory address allocation apparatus 160 may receive changed memory information from the memory pool of the resource-centric network.

In addition, the memory address allocation apparatus 160 may identify, from the changed memory information, whether a memory has been added to the memory pool.

When the memory has been added to the memory pool, the memory address allocation apparatus 160 may allocate the added memory to the additionally allocated area. The memory address allocation apparatus 160 may identify the changed memory capacity and identification information of a memory group of which the memory capacity has changed. In addition, the memory address allocation apparatus 160 may allocate the added memory to the additionally allocated area, based on the identified identification information of the memory group and the changed memory capacity. In addition, the memory address allocation apparatus 160 may store a starting address of the added memory and the added memory capacity.

When the memory is not added to the memory pool, the memory address allocation apparatus 160 may identify whether at least one of existing memories is deleted.

When an existing memory is deleted, the memory address allocation apparatus 160 may delete a memory, in the virtual memory area, corresponding to the memory information. The memory address allocation apparatus 160 may identify the deleted memory capacity and identification information of a memory group of which the memory capacity has changed. In addition, the memory address allocation apparatus 160 may delete a memory, in the virtual memory area, corresponding to the memory information, based on the identification information of the memory group and the deleted memory capacity. In addition, the memory address allocation apparatus 160 may store the remaining memory capacity after deletion of the memory and an ending address of the virtual memory.

In addition, when the memory is added or deleted from the memory pool, the capacity of the memory pool may change. Accordingly, a case in which the memory is not added from the memory pool and the existing memory is not deleted from the memory pool, when the memory address allocation apparatus 160 receives the changed memory information may imply that an error has occurred in the changed memory information or an error has occurred while identifying whether the memory is added to the memory pool or the existing memory is deleted from the memory pool. Thus, in case the memory is not added from the memory pool and the existing memory is not deleted from the memory pool, the memory address allocation apparatus 160 may transmit a memory change error signal to the memory pool.

The memory address allocation apparatus 160 may allow a plurality of computing devices to share an input/output (I/O) device by operating the plurality of I/O devices as one large network virtual I/O device in a resource-centric network to which the plurality of computing devices (e.g., a CPU, a GPU) and the plurality of I/O devices (e.g., a memory, a storage) are connected to each other via the interconnection interface.

In addition, in the resource-centric network structure in which a plurality of CPUs shares the memory pool, when memories constituting the memory pool are added or deleted, the memory address allocation apparatus 160 may allocate the added or deleted memory to the network virtual memory area such that the plurality of CPUs may share the memory pool without crashing.

In addition, the memory address allocation apparatus 160 may allow the plurality of CPUs to manage the network virtual memory area for each memory group by using an individual offset value such that the plurality of CPUs may perform byte-access to the memory pool.

Figure 2:
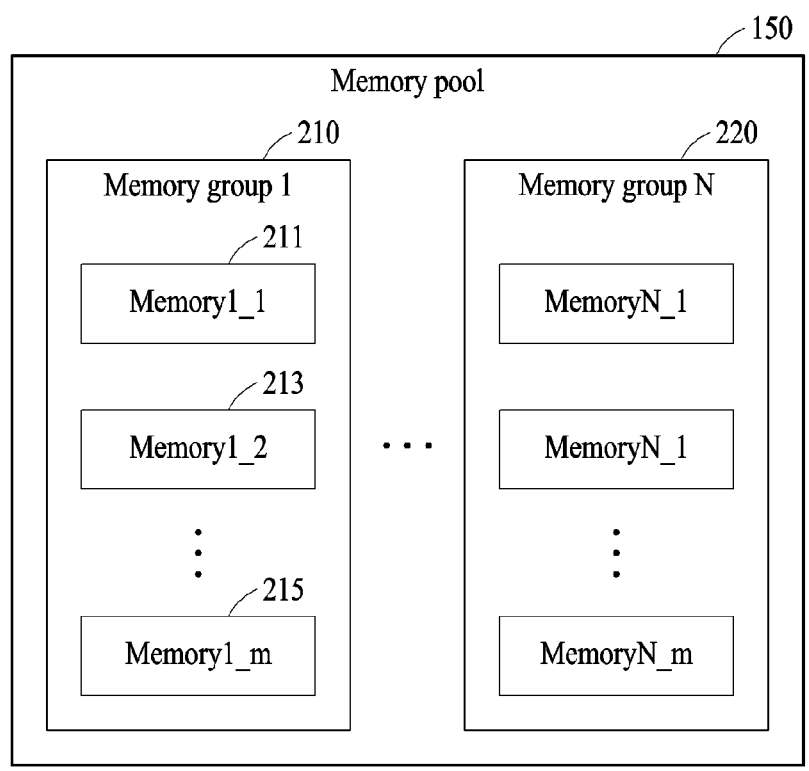
FIG. 2 is a diagram illustrating an example of a memory pool managed by a memory address allocation apparatus according to one embodiment.

FIG. 2 is a diagram illustrating an example of a memory pool managed by a memory address allocation apparatus according to one embodiment.

A memory pool 200 managed by the memory address allocation apparatus 160 may be configured with a plurality of memory groups 210 and 220, as illustrated in FIG. 2. In addition, the memory address allocation apparatus 160 may gradually increase or decrease the total capacity of the memory pool by adding or deleting a memory group to or from the memory pool as necessary.

Each of the memory groups 210 and 220 may be configured in a plurality of memories 211, 213, and 215. In addition, the memory address allocation apparatus 160 may gradually increase or decrease the capacity of a memory group by adding or deleting a memory to or from each of the memory groups 210 and 220 as necessary.

In addition, each of the memory groups 210 and 220 may be implemented as different pieces of hardware and may include a physical I/O port that provides an interconnection interface. In addition, a memory constituting the memory groups 210 and 220 may be implemented in a memory group in the form of an individual memory device or a dual in-line memory module (DIMM).

When the capacity of the memory pool 200 changes in operation of the resource-centric network system, the memory address allocation apparatus 160 may allow all CPUs connected via the interconnection interface to share changed memory pool information.

Figure 3:
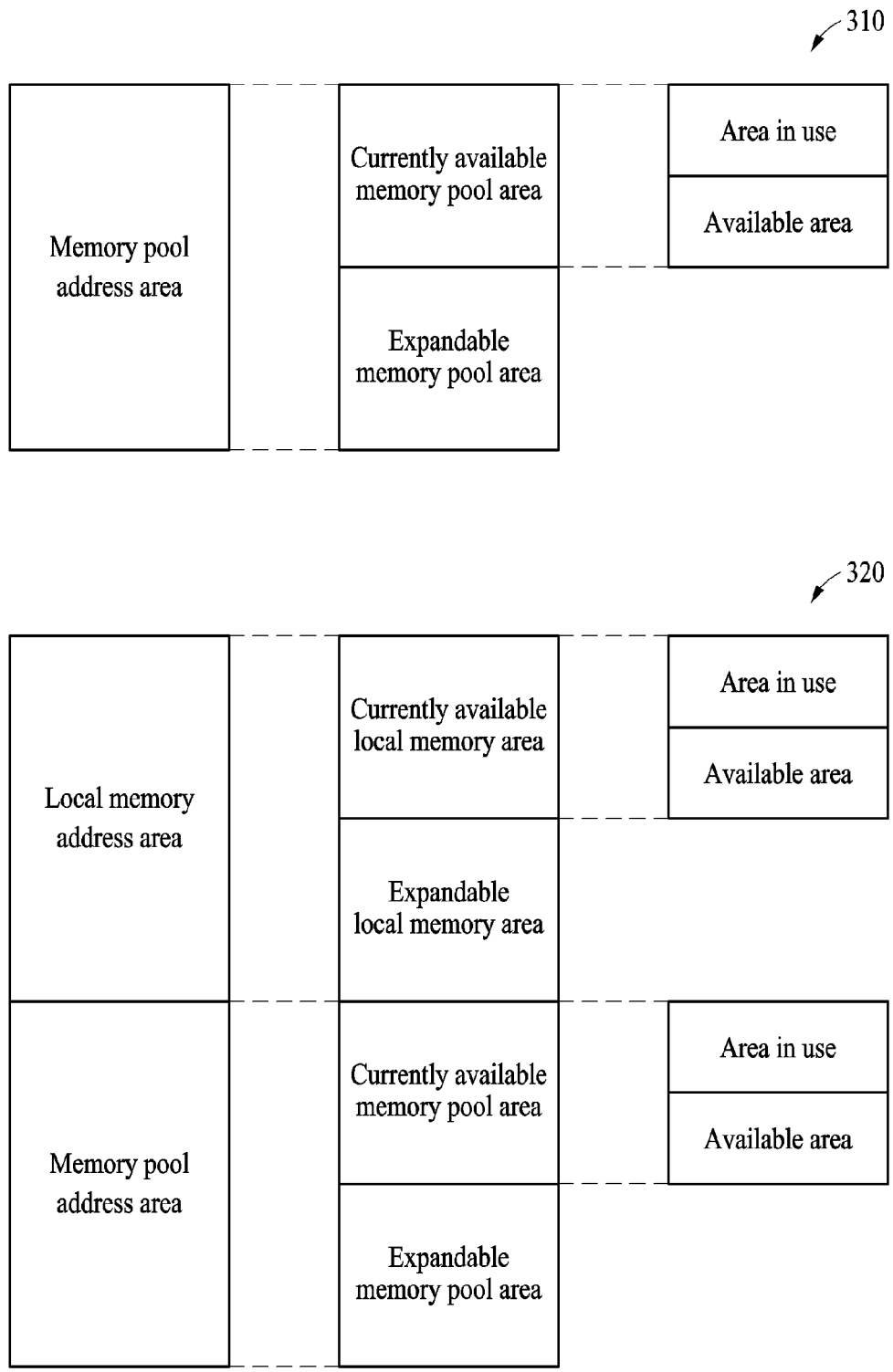
FIG. 3 is a diagram illustrating an example of a method of managing a virtual memory address of a memory address allocation apparatus, according to one embodiment.

FIG. 3 is a diagram illustrating an example of a method of managing a virtual memory address of a memory address allocation apparatus, according to one embodiment.

A network virtual memory 310 managed by the memory address allocation apparatus 160 may be managed and may be divided into a currently available memory pool area and an expandable memory pool area. In addition, the total capacity of a network virtual memory managed by the memory address allocation apparatus 160 may be defined by a sum of the capacity of the currently available memory pool and the capacity of the expandable memory pool. The currently available memory pool area may be a total memory area implemented in the memory group and may be configured in an area in use that is a memory area used by a currently performed service and a remaining available area that is not used in the currently performed service. In addition, when the maximum amount of memory is mounted in all memory groups, the expandable memory pool area may be an area subtracting the current total memory area mounted in the memory groups from the maximum expandable memory pool area.

The memory address allocation apparatus 160 may be configured as a separate server and may manage all network resources (e.g., a CPU, a GPU, a memory, and a storage) connected via the interconnection interface.

In addition, the CPU 110 may generate a new network virtual memory map 320 by adding a network virtual memory area provided by the memory address allocation apparatus 160 to a local memory area of the CPU 110. The local memory address area may be divided into a currently available memory area and an expandable memory area, same as the memory pool address area, and may have different local memory areas for each CPU.

Figure 4:
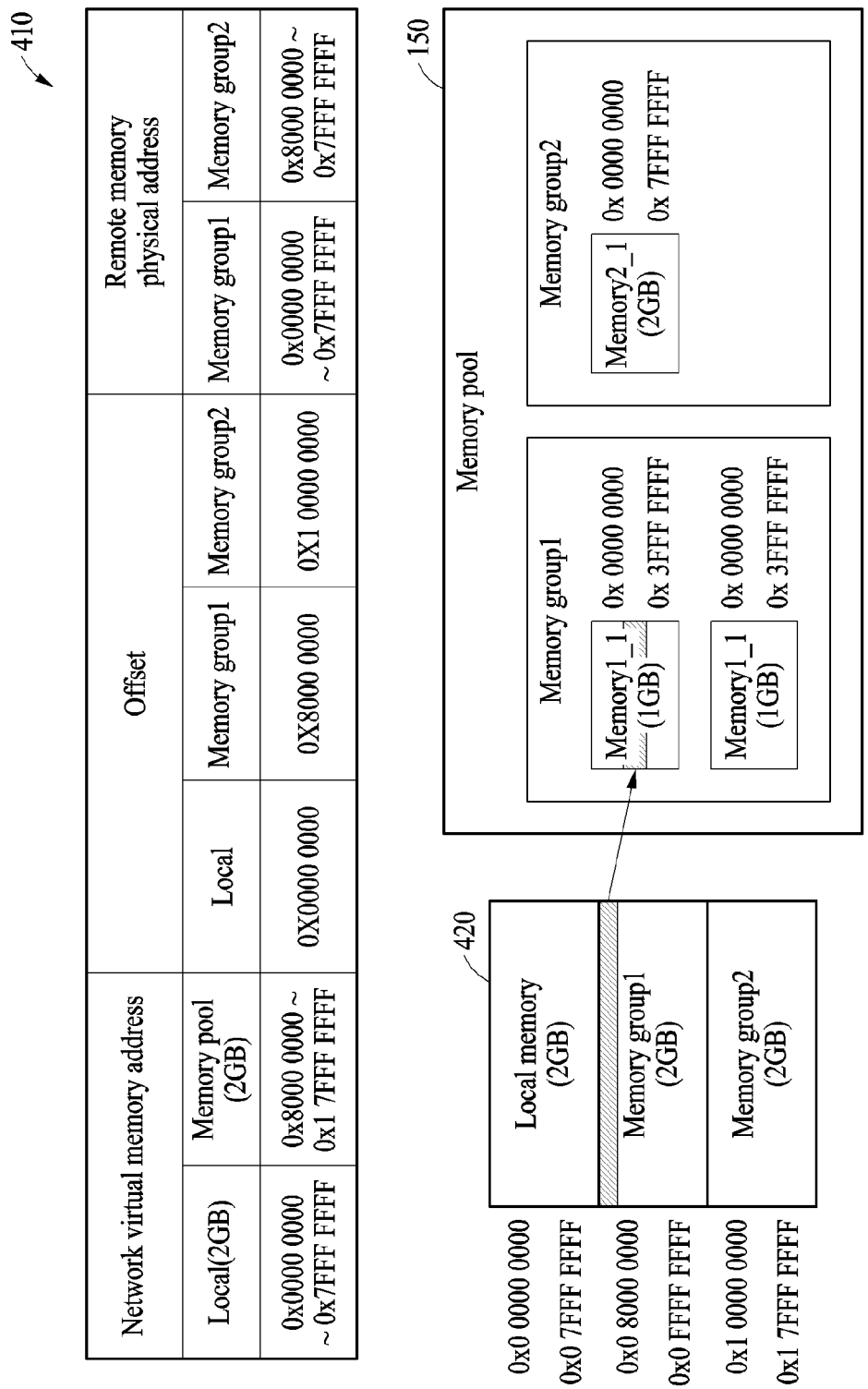
FIG. 4 is a diagram illustrating an example of configuring a virtual memory map by a central processing unit (CPU) of a resource-centric network according to one embodiment.

FIG. 4 is a diagram illustrating an example of configuring a virtual memory map by a CPU of a resource-centric network according to one embodiment.

The memory address allocation apparatus 160 may periodically transmit a memory pool address to the CPU 110 and may transmit the memory pool address to the CPU 110 in response to a request of the CPU 110. In addition, the CPU 110 may generate and manage a virtual memory map 410 as illustrated in FIG. 4.

The CPU 110 may have a local memory 420 having a capacity of 2 gigabyte (GB) and the local memory 420 may be configured in a currently available local memory area and an expandable local memory area.

In addition, a memory pool area that the memory address allocation apparatus 160 provides to the CPU 110 may be a currently available memory pool area that is the local memory 420 of 4 GB and may be configured in a memory group 1 and a memory group 2. For example, the size of the memory group 1 and the size of the memory group 2 may both be 2 GB.

The CPU 110 may separate a local memory address and a memory pool address from the network virtual memory address by using an offset value. The CPU 110 may have the offset value internally calculated for each memory area. For example, the offset values of the local memory, the memory group 1, and the memory group 2 may be 0x0000 0000, 0x8000 0000, and 0x1 0000 0000, respectively. In addition, when the memory address allocation apparatus 160 receives a request for a new service, the memory address allocation apparatus 160 may allocate, in the network virtual memory, a memory area necessary for accommodating the new service and may transmit, to the CPU 110, memory information generated based on allocation. The CPU 110 may identify a location of the memory group in actual use and a memory address in the memory group by subtracting the offset value from the network virtual memory address that is input by the memory address allocation apparatus 160. A correlation between the network virtual memory address managed by the CPU 110 and the actual memory address located in the memory pool 200 may be the same as illustrated in FIG. 4.

When a memory to use is located in the memory pool 150, the CPU 110 may find a memory group corresponding to the memory to use and an actual memory address implemented in the memory group.

Then, the CPU 110 may determine an optical output port based on optical link connection information that is input to the CPU 110 by the memory address allocation apparatus 160.

Figure 5:
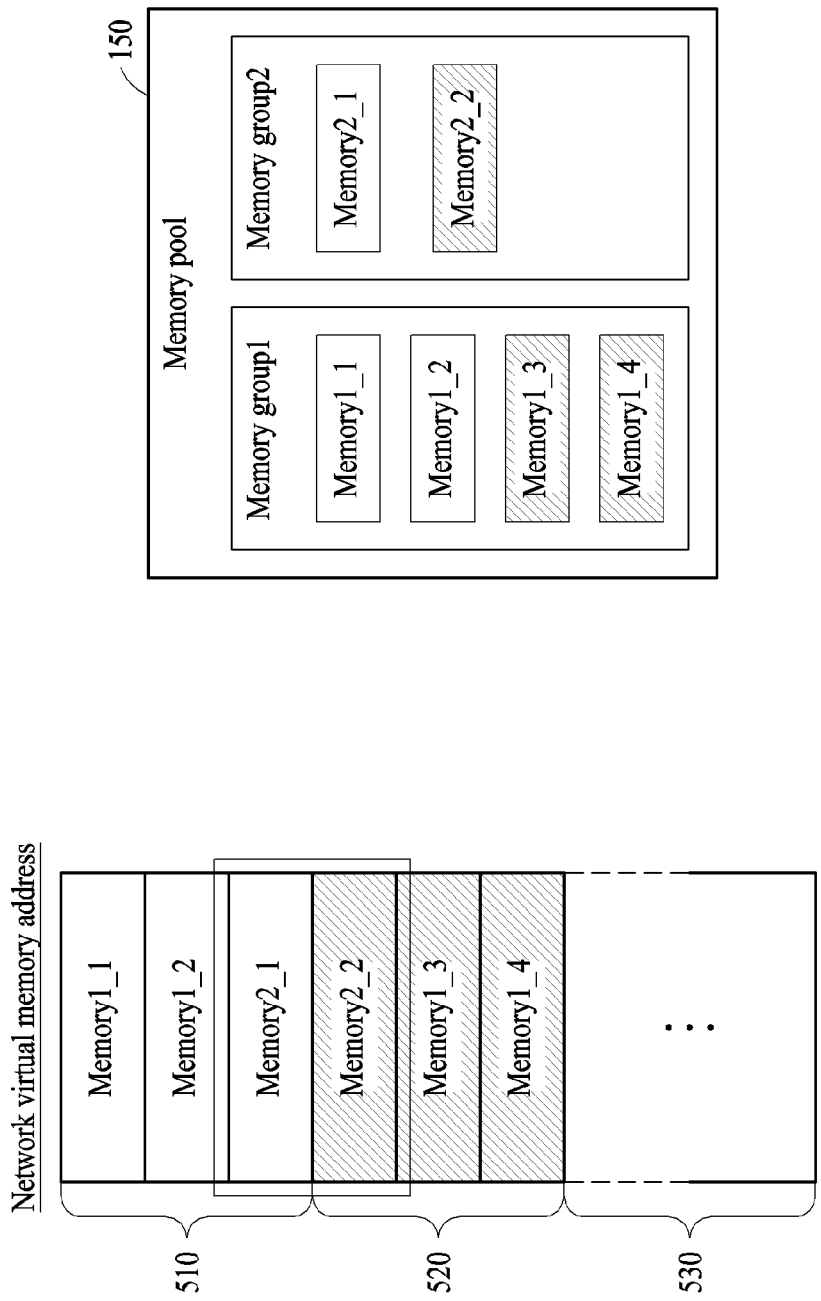
FIG. 5 is a diagram illustrating an example of adding a memory the memory pool according to one embodiment.

FIG. 5 is a diagram illustrating an example of adding a memory to the memory pool according to one embodiment.

The memory pool may be configured with a plurality of memories and may additionally insert a physical memory or delete an inserted memory from the memory pool as necessary. Accordingly, a set of memories inserted together at the same time to the memory pool may be defined as a pre-allocated virtual memory area 510.

An additionally allocated area 520 of the virtual memory may be an area where the set of memories inserted together is allocated when a physical memory is additionally inserted into the memory pool, as illustrated in FIG. 5.

In addition, an additionally expandable memory pool area 530 may be a space subtracting a memory pool area (e.g., a sum of a memory pool area of pre-allocated a virtual memory and a memory pool area of an additionally allocated area) to which a current memory address is allocated from the maximum expandable memory pool capacity and may refer to a memory pool area that is expandable by additionally inserting a physical memory to the memory pool, as necessary.

In case a memory is added to the memory group, the memory group to which the memory is added may transmit, to the memory address allocation apparatus 160, memory identification information and an added memory capacity. The memory address allocation apparatus 160 may allocate the newly added memory to the next address of the ending address of the previously allocated memory pool area. In addition, the memory address allocation apparatus 160 may define the area to which the newly added memory is allocated as the additionally allocated area 520 of the virtual memory and manage the area.

The memory address allocation apparatus 160 may consecutively arrange memory areas in the same memory group. For example, as illustrated in FIG. 5, the pre-allocated virtual memory area 510 in the memory pool may be a memory 1_1 and a memory 1_2 of a memory group 1 and a memory 2_1 of a memory group 2.

Memories 1_3, 1_4, and 2_2 may be added. Since the ending address of the pre-allocated virtual memory area 510 is included in the memory 2_1 of the memory group 2, the memory address allocation apparatus 160 may allocate such that a starting address of the memory 2_2 of the memory group 2 included in the same memory group as the memory 2_1 is consecutively located after the ending address of the memory 2_1. In addition, the memory address allocation apparatus 160 may allocate an address of the memory 1_3 of the memory group 1 and an address of the memory 14 of the memory group 1 to be consecutive after the ending address of the memory 2_2.

Since memories included in the memory pool are implemented as different pieces of hardware for each memory group, the memory address allocation apparatus 160 may effectively use an interconnection interface I/O port limited to each memory group by consecutively arranging memory areas in the same memory groups. In addition, by effectively using the interconnection interface I/O port limited to each memory group, the memory address allocation apparatus 160 may easily manage a network virtual memory address.

FIGS. 6 to 10 are diagrams illustrating, by cases, a process of allocating a memory area to a network virtual memory when the memory address allocation apparatus 160 receives a new service request.

Figure 6:
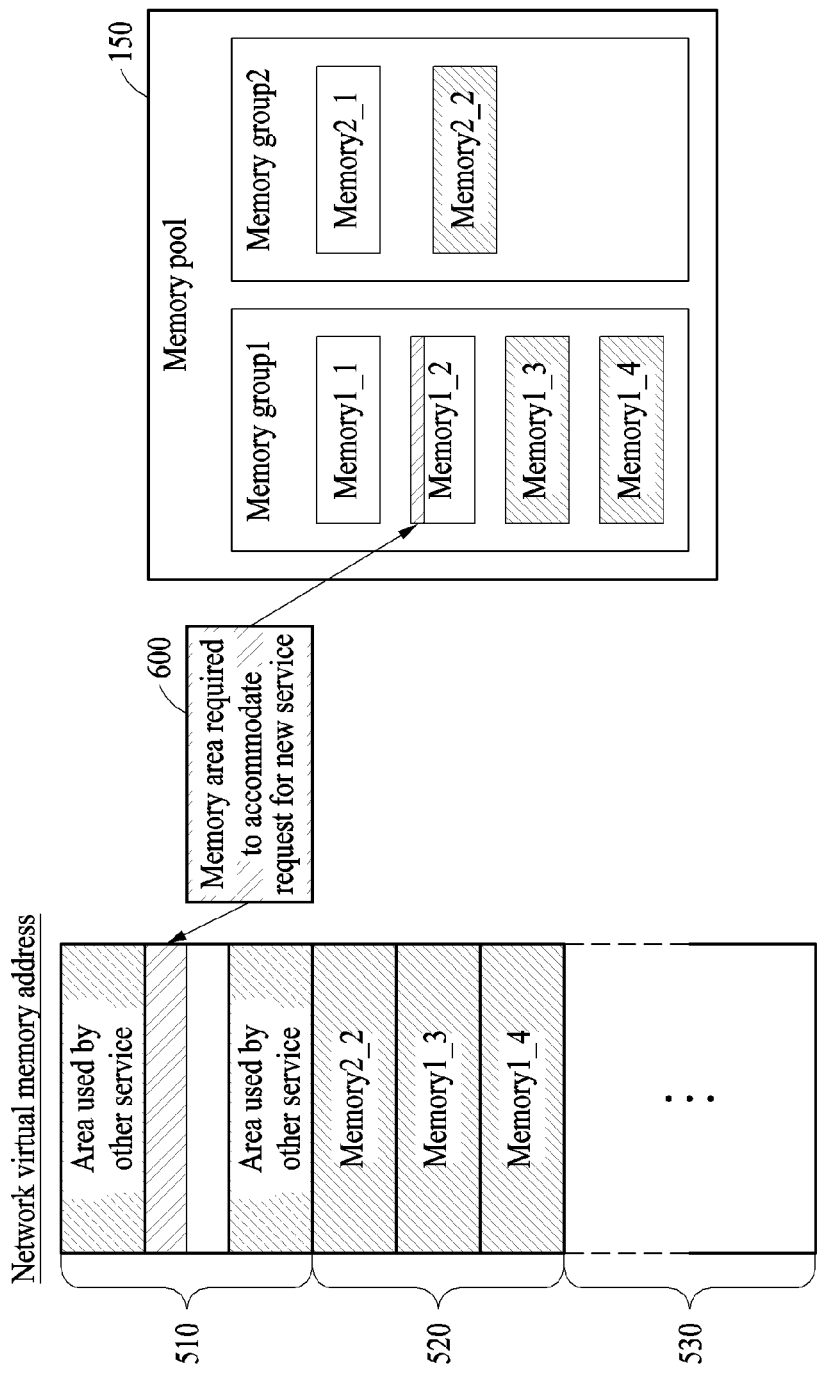
FIG. 6 is a diagram illustrating an example of allocating a memory address according to a first embodiment.

FIG. 6 is an example of allocating a memory when the new service may be accommodated in the same memory group in the pre-allocated virtual memory area 510. For example, the case may be one where the memory 1_1 and the memory 1_2 are allocated as consecutive addresses, only the memory 1_1 is used by other service and the new service may be accommodated by only using the memory 1_2.

In this case, the memory address allocation apparatus 160 may allocate a memory area 600 required to accommodate the new service in succession of a memory area used by the other service as illustrated in FIG. 6. For example, the memory address allocation apparatus 160 may allocate the memory area 600 required to accommodate the new service to the memory 1_2.

Figure 7:
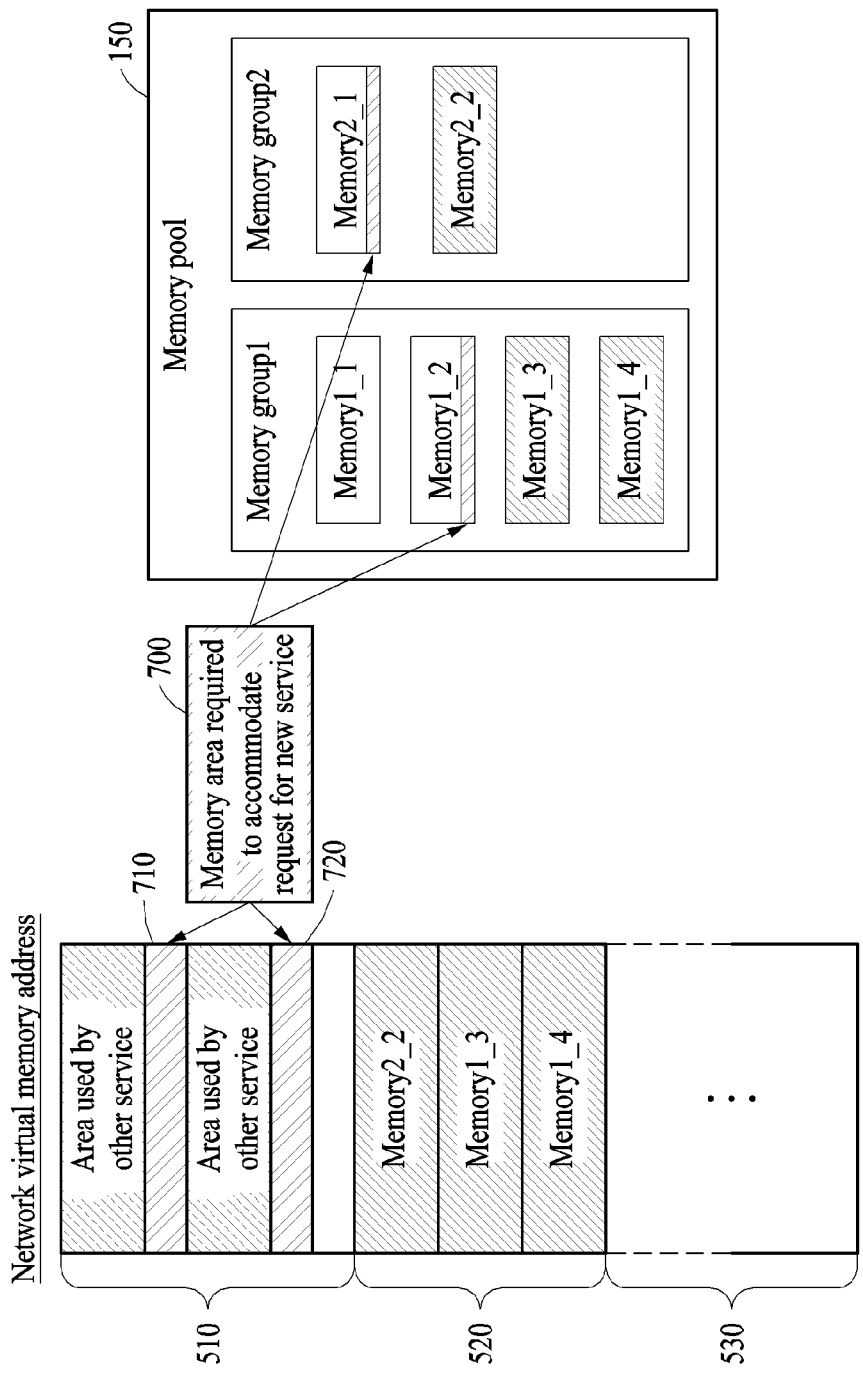
FIG. 7 is a diagram illustrating an example of allocating a memory address according to a second embodiment.

FIG. 7 is an example of allocating a memory when the new service may be accommodated in a different memory group in the pre-allocated virtual memory area 510. For example, since memories in the memory group 1 perform a different service from memories in the memory group 2, the new service may not be performed by available capacity of the memory group 1 or the memory group 2. However, the new service may be performed by joining the available capacity of the memory group 1 with the available capacity of the memory group 2.

As illustrated in FIG. 7, the memory address allocation apparatus 160 may allocate a memory area 700 required to accommodate the new service to a partial area 710 of the memory group 1 and a partial area 720 of the memory group 2. To provide one service by two different memory groups, setting a new optical link may be needed.

Figure 8:
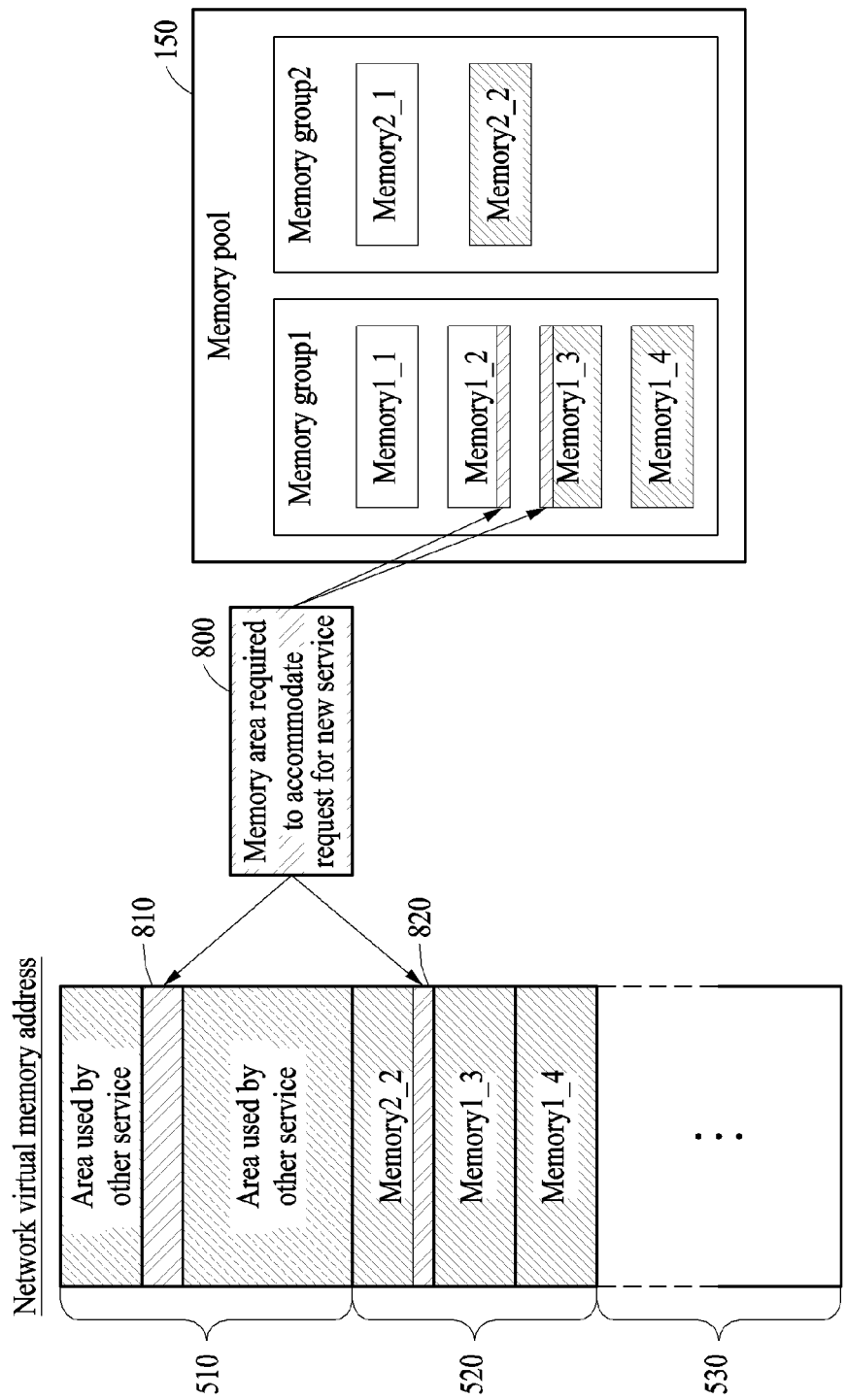
FIG. 8 is a diagram illustrating an example of allocating a memory address according to a third embodiment.

FIG. 8 is an example of allocating a memory when the new service may not be accommodated in the pre-allocated virtual memory area 510 and the new service may be accommodated in a newly added same memory group.

As illustrated in FIG. 8, the memory address allocation apparatus 160 may allocate a memory area 800 required to accommodate a new service in a partial area 810 of the pre-allocated virtual memory area 510 and a partial area 820 of the additionally allocated area 520 of the virtual memory. For example, the memory address allocation apparatus 160 may accommodate the new service without setting a new optical link by allocating the new service to a partial area of the memory 1_2 corresponding to the pre-allocated virtual memory area 510 and a partial area of the memory 1_3 corresponding to the additionally allocated area 520 of the virtual memory.

Figure 9:
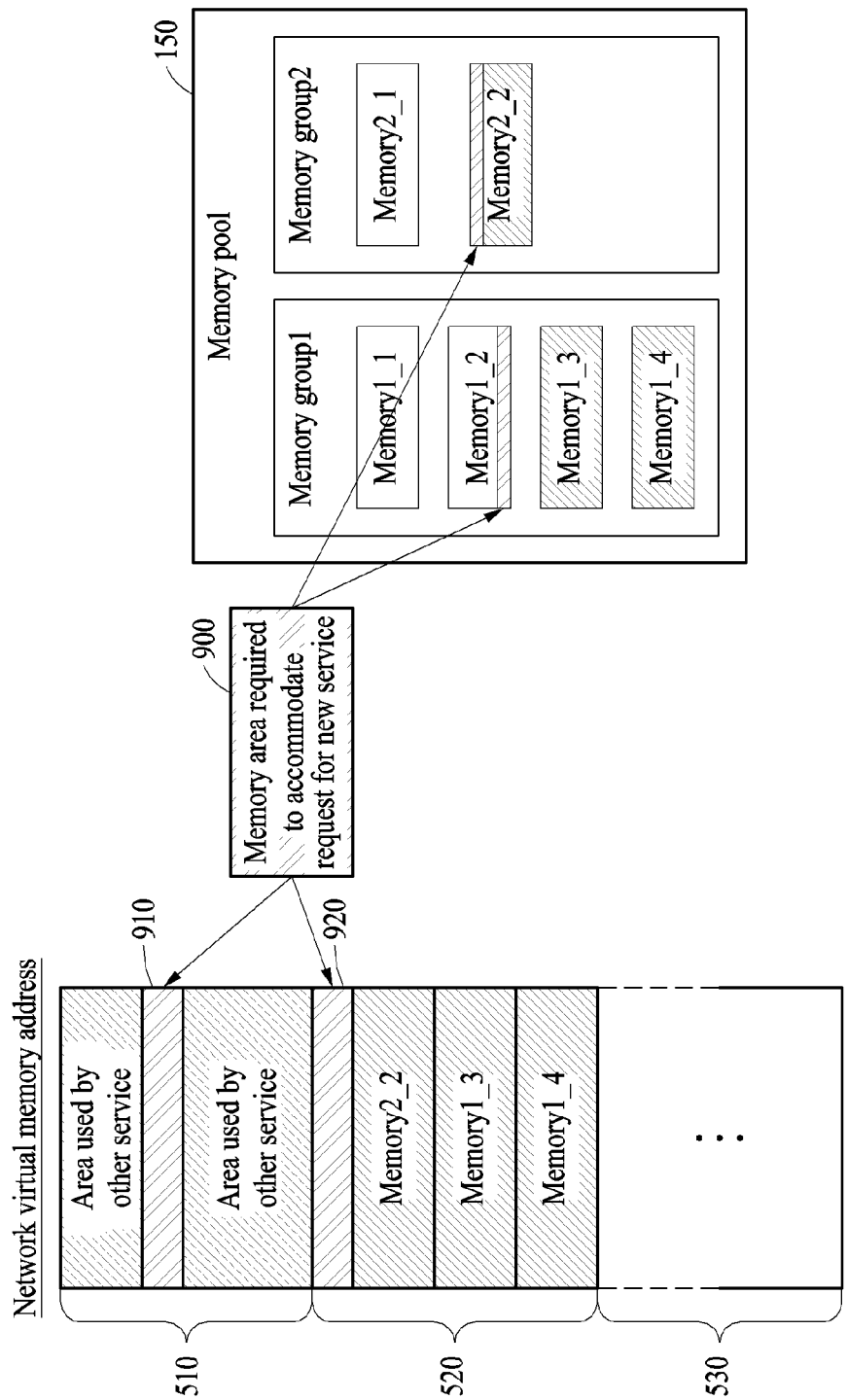
FIG. 9 is a diagram illustrating an example of allocating a memory address according to a fourth embodiment.

FIG. 9 is an example of allocating a memory when a new service may not be accommodated in the pre-allocated virtual memory area 510 and the new service may be accommodated in a different memory group included in the additionally allocated area 520 of the virtual memory. For example, this may be a case where an area of the memory 1_2 included in the pre-allocated virtual memory area 510 and an area of the memory 2_2 included in the additionally allocated area 520 of the virtual memory are needed to perform the new service.

As illustrated in FIG. 9, the memory address allocation apparatus 160 may allocate a memory area 900 required to accommodate the new service in a partial area 910 of the pre-allocated virtual memory area 510 and a partial area 920 of the additionally allocated area 520 of the virtual memory. For example, the memory address allocation apparatus 160 may accommodate the new service without setting a new optical link by allocating the new service to a partial area of the memory 1_2 corresponding to the pre-allocated virtual memory area 510 and a partial area of the memory 2_2 corresponding to the additionally allocated area 520 of the virtual memory. However, since the memory 12 is included in a different group from the memory 2_2, the memory address allocation apparatus 160 may set a new optical link to provide one service by two different memory groups.

Figure 10:
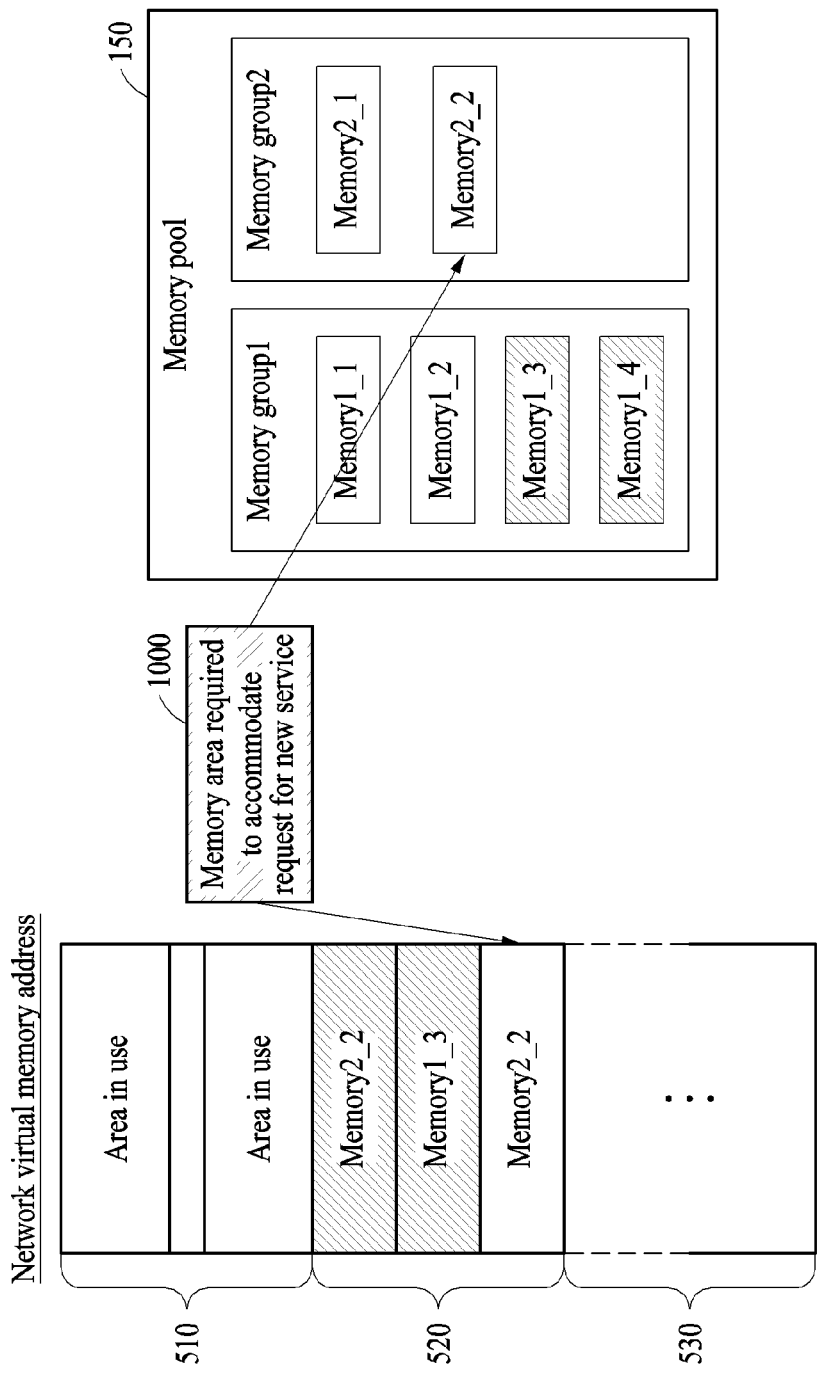
FIG. 10 is a diagram illustrating an example of allocating a memory address according to a fifth embodiment.

FIG. 10 is an example of allocating a memory when there is no space to completely or partially accommodate the new service in the pre-allocated virtual memory area 510.

The memory address allocation apparatus 160 may allocate a memory area 1000 required to accommodate the new service by only using the additionally allocated area 520 of the virtual memory. For example, the memory address allocation apparatus 160 may allocate the new service to only an area of the memory 2_2 corresponding to the additionally allocated area 520 of the virtual memory.

Figure 11:
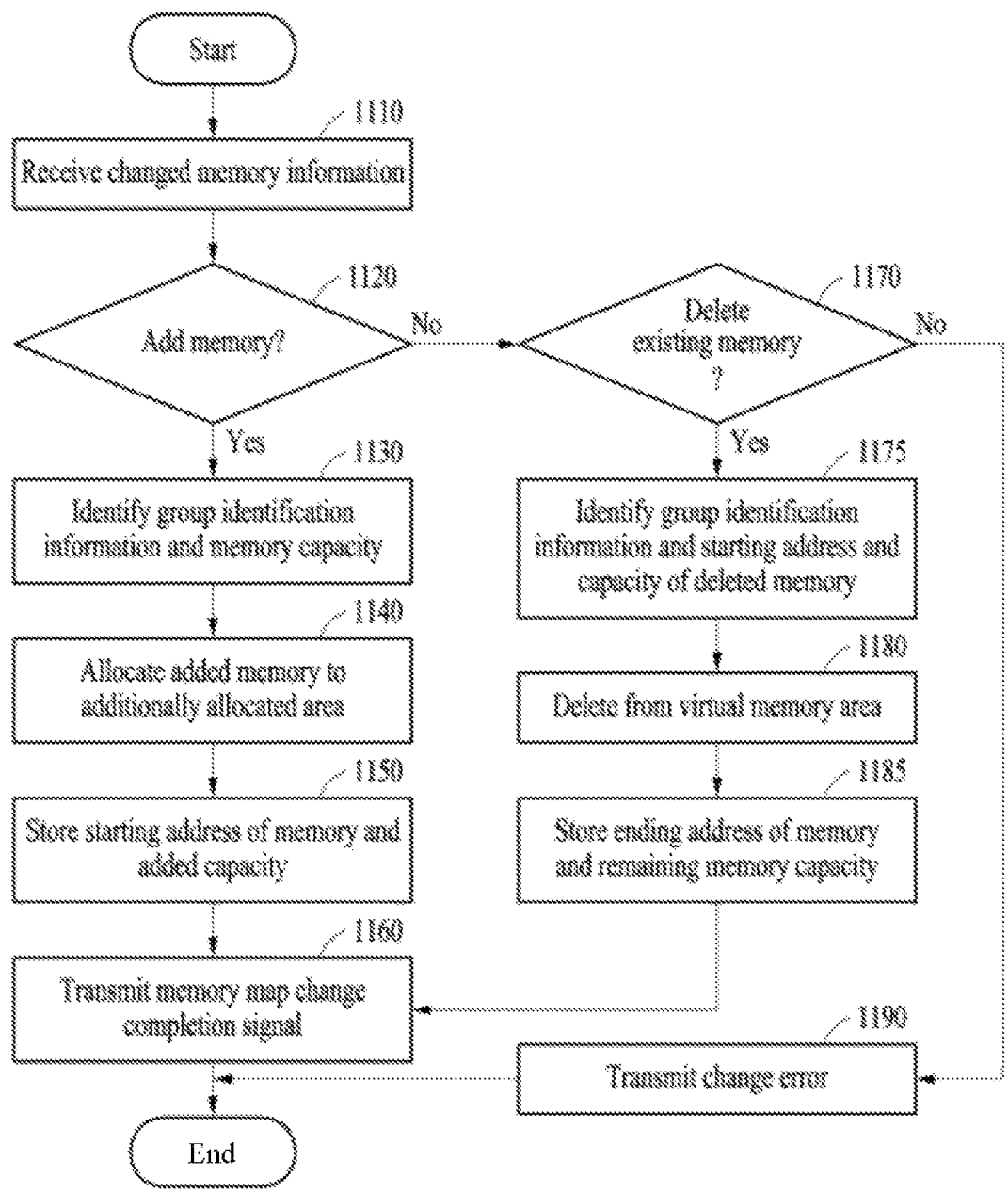
FIG. 11 is a flowchart illustrating a method of changing a memory address, according to one embodiment.

FIG. 11 is a flowchart illustrating a method of changing a memory address, according to one embodiment.

In operation 1110, when the capacity of a memory pool changes, the memory address allocation apparatus 160 may receive changed memory information from the memory pool of a resource-centric network. The changed memory information may include at least one of identification information of added memory, capacity of the added memory, and identification information of a memory to be deleted.

In operation 1120, the memory address allocation apparatus 160 may identify, from the changed memory information, whether a memory has been added. When the changed memory information includes the identification information of added memory and the capacity of the added memory, the memory address allocation apparatus 160 may determine that the memory has been added. In addition, when the changed memory information does not include the identification information and the capacity of the added memory, the memory address allocation apparatus 160 may determine that the memory has not been added. When the memory has been added, the memory address allocation apparatus 160 may perform operation 1130. In addition, when the memory has not been added, the memory address allocation apparatus 160 may perform operation 1170.

In operation 1130, the memory address allocation apparatus 160 may identify changed memory capacity and identification information of a memory group of which the memory capacity has changed. The memory address allocation apparatus 160 may identify the identification information of a memory group including the added memory, based on the identification information, included in the changed memory information, of the added memory. In addition, the memory address allocation apparatus 160 may increase the memory capacity of the memory group, based on the capacity of the added memory included in the changed memory information. Specifically, the memory address allocation apparatus 160 may determine the changed capacity of the memory by adding the prior capacity of the memory group of which the memory capacity has been changed to the capacity of the added memory.

In operation 1140, the memory address allocation apparatus 160 may allocate the added memory to the additionally allocated area, based on the identification information of the memory group and the changed memory capacity, which are identified in operation 1130.

In operation 1150, the memory address allocation apparatus 160 may store a starting address of the added memory and the added memory capacity.

In operation 1160, the memory address allocation apparatus 160 may transmit, to the memory pool, a completion signal of changing a memory map.

In operation 1170, the memory address allocation apparatus 160 may identify whether at least one of existing memories is to be deleted.

When identification information of the memory to be deleted is included in the changed memory information, the memory address allocation apparatus 160 may determine that at least one of the existing memories is to be deleted. When identification information of the memory to be deleted is not included in the changed memory information, the memory address allocation apparatus 160 may determine that at least one of the existing memories is not deleted. When at least one of the existing memories is deleted, the memory address allocation apparatus 160 may perform operation 1175. In addition, when at least one of the existing memories is not deleted, the memory address allocation apparatus 160 may perform operation 1190.

In operation 1175, the memory address allocation apparatus 160 may identify identification information of the memory group of which the memory capacity has been changed, a starting address of the deleted memory, and capacity of the deleted memory. The memory address allocation apparatus 160 may identify the identification information of the memory group including the memory capacity, based on the identification information of the "memory to be deleted" included in the changed memory information. In addition, the memory address allocation apparatus 160 may decrease the memory capacity of the memory group, based on the memory capacity corresponding to the identification information of the memory to be deleted. Specifically, the memory address allocation apparatus 160 may determine the changed memory capacity by subtracting the memory capacity corresponding to the identification information of the memory to be deleted from the existing capacity of the memory group of which the memory capacity has been changed.

In operation 1180, the memory address allocation apparatus 160 may delete the memory corresponding to the memory information from the virtual memory area, based on the identification information of the memory group, the starting address of the memory to be deleted, and the capacity of the deleted memory.

In operation 1185, the memory address allocation apparatus 160 may store the ending address of the virtual memory and remaining memory capacity after deletion of the memory.

In operation 1190, the memory address allocation apparatus 160 may transmit a memory change error signal to the memory pool.

In addition, when the memory address allocation apparatus 160 periodically transmits changed memory address information to all CPUs 110 in the network or receives a request from the CPU 110 after performing operation 1160 or operation 1190, the memory address allocation apparatus 160 may transmit the changed memory address information to the CPU 110 that requests the changed memory address information.

Figure 12:
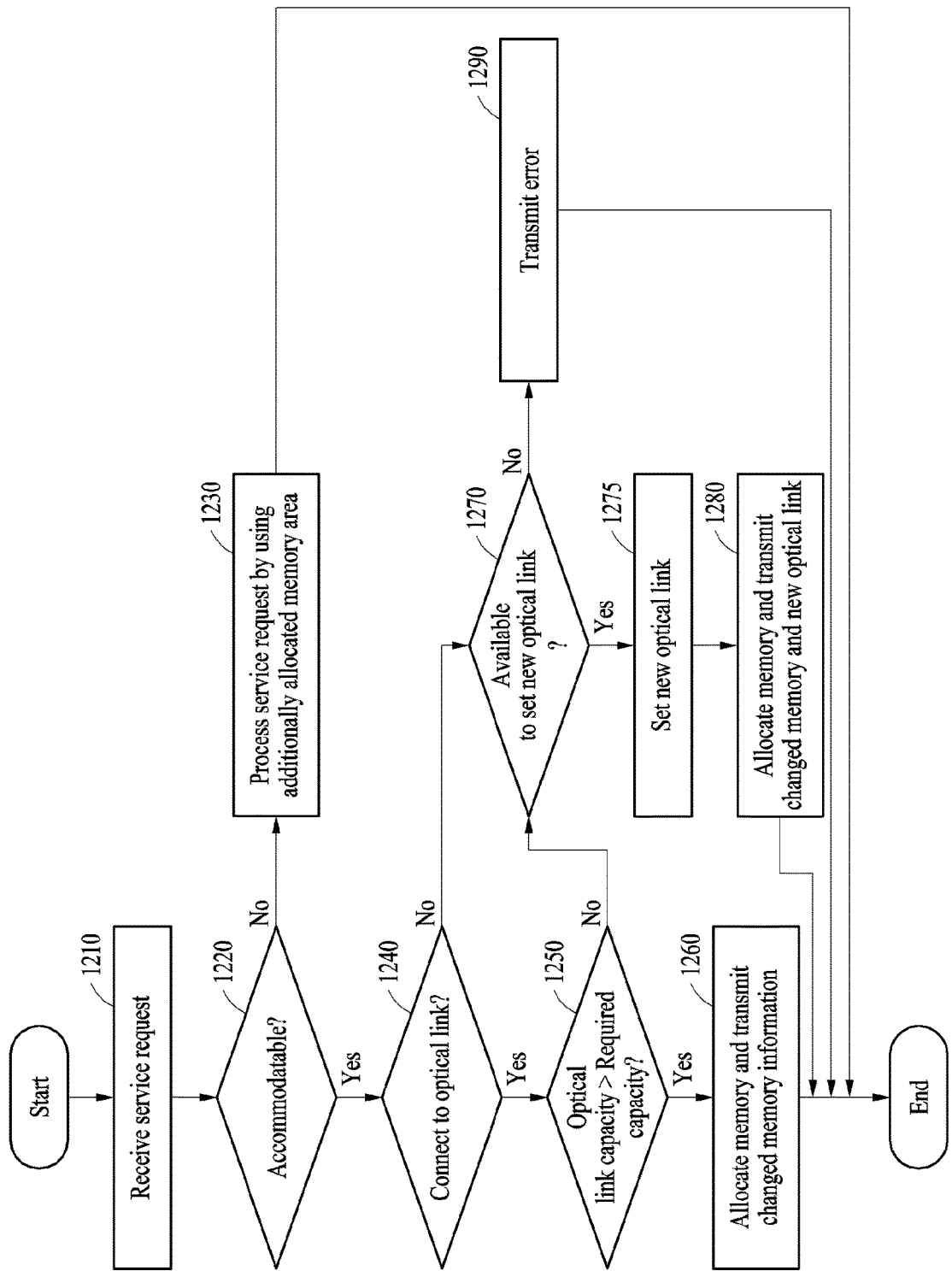
FIG. 12 is a flowchart illustrating a method of allocating a memory address, according to one embodiment.

FIG. 12 is a flowchart illustrating a method of allocating a memory address, according to one embodiment.

In operation 1210, the memory address allocation apparatus 160 may receive a request for a new service from a user.

In operation 1220, the memory address allocation apparatus 160 may determine whether the new service, received in operation 1210, is able to be accommodated by a virtual memory pre-allocated in the memory pool of the resource-centric network. For example, in a state as illustrated in FIGS. 6 and 7, the memory address allocation apparatus 160 may determine that the new service is able to be accommodated. In addition, when the new service is able to be accommodated, the memory address allocation apparatus 160 may perform operation 1240. For example, in a state as illustrated in FIGS. 8, 9, and 10, the memory address allocation apparatus 160 may determine that the new service may not be accommodated. In addition, when the new service is not able to be accommodated, the memory address allocation apparatus 160 may perform operation 1230.

In operation 1230, the memory address allocation apparatus 160 may allocate the memory area by using an additionally allocated area of a virtual memory of the resource-centric network.

In operation 1240, the memory address allocation apparatus 160 may determine whether an available memory that may allocate the memory area among memories corresponding to the pre-allocated virtual memory is connected, via an optical link, to the CPU 110 to perform the new service. When the available memory is connected to the optical link, the memory address allocation apparatus 160 may perform operation 1250. In addition, when the available memory is not connected to the optical link, the memory address allocation apparatus 160 may perform operation 1270.

In operation 1250, the memory address allocation apparatus 160 may determine whether the capacity of the available memory connected to the CPU 110 via the optical link exceeds the required capacity to accommodate the new service. When the capacity of the optical link between the CPU 110 and the available memory connected to the CPU 110 exceeds the required capacity to accommodate the new service, the memory address allocation apparatus 160 may perform operation 1260. In addition, when the capacity of the optical link between the CPU 110 and the available memory connected to the CPU 110 is less than the required capacity to accommodate the new service, the memory address allocation apparatus 160 may perform operation 1270.

In operation 1260, the memory address allocation apparatus 160 may allocate a memory area for accommodating the new service to the available memory and may transmit, to the CPU 110, memory information changed based on allocation of the memory area.

In operation 1270, the memory address allocation apparatus 160 may determine whether a new optical link to an available memory that may allocate the memory area among memories corresponding to the pre-allocated virtual memory may be set.

In case the new optical link may be set, the memory address allocation apparatus 160 may perform operation 1275. In addition, in case the new optical link may not be set, the memory address allocation apparatus 160 may perform operation 1290.

In operation 1275, the memory address allocation apparatus 160 may set a new optical link between the CPU 110 and an available memory that may allocate a memory area among memories corresponding to the pre-allocated virtual memory.

In operation 1280, the memory address allocation apparatus 160 may allocate the memory area to the available memory to which the new optical link is set in operation 1275 and may transmit, to the CPU 110, the new optical link and memory information changed based on allocation of the memory area.

In operation 1290, the memory address allocation apparatus 160 may transmit a new service accommodation error signal.

Figure 13:
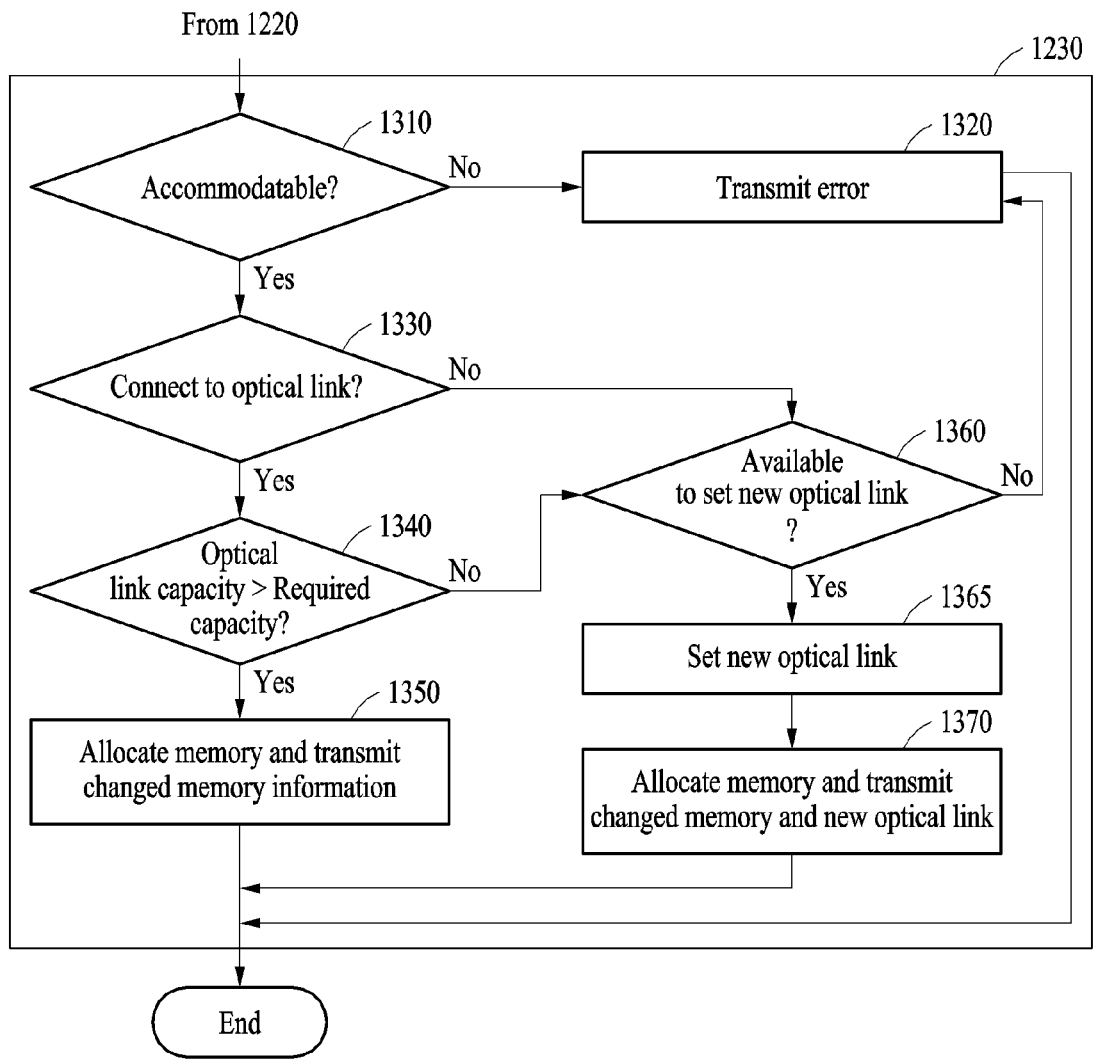
FIG. 13 is a flowchart illustrating an example of a process of processing a service request by using an additionally allocated memory area described with reference to FIG. 12.

FIG. 13 is a flowchart illustrating an example of a process of processing a service request by using an additionally allocated memory area described with reference to FIG. 12. Operations 1310 to 1370 of FIG. 13 may be included in operation 1230 of FIG. 12.

In operation 1310, the memory address allocation apparatus 160 may determine whether a new service is able to be accommodated by using an additionally allocated area. In addition, in case the new service is able to be accommodated by using the additionally allocated area, the memory address allocation apparatus 160 may perform operation 1330. In addition, when the new service is not able to be accommodated by using the additionally allocated area, the memory address allocation apparatus 160 may perform operation 1320.

In addition, the memory address allocation apparatus 160 may determine whether to accommodate the new service by using both an available space of the pre-allocated virtual memory and an available space of the additionally allocated area together as illustrated in FIGS. 8 and 9, or using only an available space of the additionally allocated area as illustrated in FIG. 10.

In operation 1320, the memory address allocation apparatus 160 may transmit a new service accommodation error signal to the input/output (I/O) device of the memory address allocation apparatus 160.

In operation 1330, the memory address allocation apparatus 160 may determine whether an available memory that may allocate the memory area among memories corresponding to the additionally allocated area is connected, via an optical link, to the CPU 110 to perform the new service. When the available memory is connected to the optical link, the memory address allocation apparatus 160 may perform operation 1340. In addition, when the available memory is not connected to the optical link, the memory address allocation apparatus 160 may perform operation 1360.

In operation 1340, the memory address allocation apparatus 160 may determine whether the capacity of the available memory connected to the CPU 110 via the optical link exceeds the required capacity to accommodate the new service. When the capacity of the optical link between the CPU 110 and the available memory connected to the CPU 110 exceeds the required capacity to accommodate the new service, the memory address allocation apparatus 160 may perform operation 1350. In addition, when the capacity of the optical link between the CPU 110 and the available memory connected to the CPU 110 is less than the required capacity to accommodate the new service, the memory address allocation apparatus 160 may perform operation 1360.

In operation 1350, the memory address allocation apparatus 160 may allocate a memory area in the available memory and may transmit, to the CPU 110, memory information changed based on allocation of the memory area.

In operation 1360, the memory address allocation apparatus 160 may determine whether a new optical link between the CPU 110 and an available memory that may allocate the memory area among memories corresponding to the additionally allocated area may be set. In case setting the new optical link may be set, the memory address allocation apparatus 160 may perform operation 1365. In addition, in case the new optical link may not be set, the memory address allocation apparatus 160 may perform operation 1320.

In operation 1365, the memory address allocation apparatus 160 may set a new optical link to an available memory that may allocate the memory area among memories corresponding to the additionally allocated area.

In operation 1370, the memory address allocation apparatus 160 may allocate the memory area to the available memory to which the new optical link is set in operation 1365 and may transmit, to the CPU 110, the new optical link and memory information changed based on allocation of the memory area.

Figure 14:
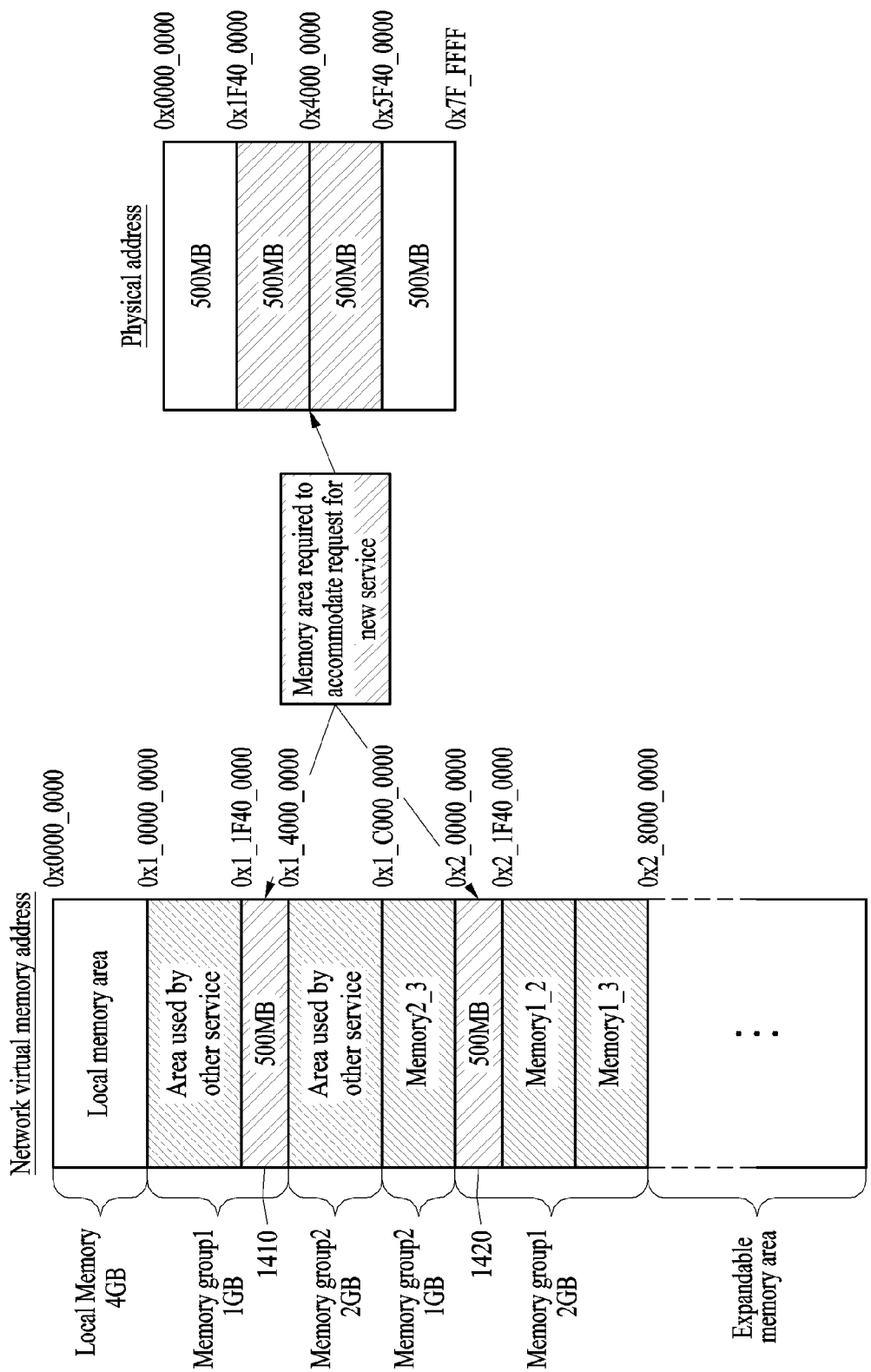
FIG. 14 is a diagram illustrating an example of a process of allocating a virtual memory address of a memory address allocation apparatus, according to one embodiment.

FIG. 14 is a diagram illustrating an example of a process of allocating a virtual memory address of a memory address allocation apparatus, according to one embodiment.

The CPU 110 that receives at least one of new optical link information and changed memory information according to FIGS. 12 and 13 may set an optical path to a network virtual memory address based on received information.

The CPU 110 may have a local memory of 4 GB and a memory pool of 6 GB. In addition, the memory pool may be configured into two memory groups, which are a memory group 1 and a memory group 2. In addition, a pre-allocated virtual memory may be configured into a memory group 1 of 1 GB and a memory group 2 of 2 GB and an additionally allocated area may be configured in a memory group of 1 GB and a memory group 1 of 2 GB.

In this case, a network virtual memory address for each memory group managed by the CPU 110 and an offset value may be the same as illustrated in FIG. 14. The CPUs 110 connected via an interconnection interface may have different offset values since each of the CPUs 110 has an individually used local memory.

When a new service that requires a total memory of 1 GB is requested while another service uses the total capacity of the memory group 2 and a lower address of 500 MB of the memory group 1 allocated to a pre-allocated virtual memory, the memory address allocation apparatus 160 may allocate an area of 500 MB of the memory group 1 of the pre-allocated virtual memory and an area of 500 MB of a memory group 1 located in a newly added area and may transmit information to the CPU 110. There is an advantage that a new service may be accommodated without changing an optical link by dividing and allocating the new service to different memories in the same memory group.

In this case, the CPU 110 may identify an actual memory address of the memory group 1 located in a memory pool by calculating an offset value based on the received network virtual memory information. Unlike the actual memory address of the memory group 1, the memory group 1 may be divided into two areas in the network virtual memory map. Accordingly, to find the actual memory address, an offset value for each area may be needed. For example, a starting address of the memory group 1 of the pre-allocated virtual memory may have a size of 1 GB from 0x1_0000_0000. On the other hand, a starting address of the memory group 1 of the additionally allocated area may have a size of 1 GB from 0x2_0000_0000.

Thus, the memory address allocation apparatus 160 may allocate 500 MB starting from a network virtual memory address 0x1_1F40_0000 for accommodating the new service and the offset value may be 0x1_0000_0000. The memory address allocation apparatus 160 may allocate the remaining 500 MB starting from the network virtual memory address 0x2_0000_0000 and the offset value may be 0x1_C000_0000.

The actual memory addresses from 0x1F00_000 to 0x3FFF_FFFF of the memory group 1 located in the memory pool may be identified by subtracting the offset value from the allocated network virtual memory address. In addition, the memory group may connect to a physical memory by receiving the actual memory address. Through this process, the CPU 100 may perform byte-access to a memory located in a physically separated memory pool.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of allocating a memory address in a resource-centric network, the method comprising:

receiving a request for a new service;

determining whether the new service is able to be accommodated in a virtual memory that is pre-allocated in the resource-centric network within which a plurality of central processing units (CPUs), a plurality of graphics processing units (GPUs), and a memory pool configured with a plurality of memory groups each including a plurality of memories and storages are interconnected via an interconnection interface, allowing all of the plurality of CPUs and the plurality of GPUs present on the resource-centric network to access the memory pool including the plurality of memories and storages, wherein the memory pool including the plurality of memories and storages is configured as the virtual memory, when the new service is able to be accommodated, allocating a memory area for accommodating the new service to the virtual memory; and when the new service is not able to be accommodated, allocating the memory area using an additionally allocated area of the virtual memory of the resource-centric network, wherein the virtual memory is shared by the plurality of CPUs and the plurality of GPUs in the resource-centric network, wherein the allocating of the memory area by using the additionally allocated area comprises:

when the new service is not able to be accommodated only with an available free capacity in the pre-allocated virtual memory or only with an available free capacity in the additionally allocated area while the new service is able to be performed by combining the available free capacity in the pre-allocated virtual memory with the available free capacity of the additionally allocated area, allocating a memory area for accommodating the new service to a portion of the pre-allocated virtual memory and a portion of the additionally allocated area such that a total of the portions is sufficient to accommodate the new service, wherein an optical link connection of the resource-centric network is managed based on each memory group which is implemented as a different piece of hardware and includes a physical I/O port that provides an interconnection interface.

2. The method of claim 1, wherein the allocating of the memory area for accommodating the new service comprises:
among memories corresponding to the virtual memory that is pre-allocated, determining whether an available memory for allocation of the memory area is connected to an optical link; and
when the available memory is connected to the optical link, allocating the memory area to the available memory and transmitting memory information changed based on allocation of the memory area.

3. The method of claim 2, wherein the determining of whether the available memory is connected to an optical link comprises, when the capacity of the optical link connected to the available memory is not sufficient to accommodate the new service, determining that the available memory is not connected to the optical link.

4. The method of claim 2, wherein the allocating of the memory area for accommodating the new service comprises:
when the available memory is not connected to the optical link, setting a new optical link to another available memory for allocation of the memory area among the memories corresponding to the virtual memory that is pre-allocated; and
allocating the memory area to the other available memory to which the new optical link is set and transmitting the new optical link and memory information changed based on allocation of the memory area.

5. The method of claim 4, wherein the allocating of the memory area for accommodating the new service further comprises, when the new optical link to the available memory fails to be set, transmitting a new service accommodation error signal.

6. The method of claim 1, wherein the allocating of the memory area by using the additionally allocated area further comprises:
determining whether the new service is able to be accommodated by using the additionally allocated area;
when the new service is not able to be accommodated by using the additionally allocated area, transmitting a new service accommodation error signal;
when the new service is able to be accommodated by using the additionally allocated area, determining whether an available memory that may allocate the memory area among memories corresponding to the additionally allocated area is connected to an optical link; and
when the available memory is connected to the optical link, allocating the memory area to the available memory and transmitting memory information changed based on allocation of the memory area.

7. The method of claim 6, wherein the allocating of the memory area by using the additionally allocated area further comprises:
when the available memory is not connected to the optical link, setting a new optical link to an available memory that may allocate the memory area among memories corresponding to the additionally allocated area; and
allocating the memory area to the available memory to which the new optical link is set and transmitting the new optical link and memory information changed based on allocation of the memory area.

8. The method of claim 7, wherein the allocating of the memory area by using the additionally allocated area further comprises, when the new optical link to the available memory fails to be set, transmitting a new service accommodation error signal.

9. A memory address allocation apparatus in a resource-centric network, comprising:
an input/output device configured to receive a request for a new service; and
a processor configured to:
determine whether the new service is able to be accommodated in a virtual memory that is pre-allocated in the resource-centric network within which a plurality of central processing units (CPUs), a plurality of graphics processing units (GPUs), and a memory pool configured with a plurality of memory groups each including a plurality of memories and storages are interconnected via an interconnection interface, allowing all of the plurality of CPUs and the plurality of GPUs present on the resource-centric network to access the memory pool including the plurality of memories and storages, wherein the memory pool including the plurality of memories and storages is configured as the virtual memory,
allocate a memory area for accommodating the new service to the virtual memory when the new service is able to be accommodated, and
allocate the memory area using an additionally allocated area of the virtual memory of the resource-centric network when the new service is not able to be accommodated,
wherein the virtual memory is shared by the plurality of CPUs and the plurality of GPUs in the resource-centric network,
wherein the processor is further configured to:
allocate a memory area for accommodating the new service to a portion of the pre-allocated virtual memory and a portion of the additionally allocated area such that a total of the portions is sufficient to accommodate the new service, when the new service is not able to be accommodated only with an available free capacity in the pre-allocated virtual memory or only with an available free capacity in the additionally allocated area while the new service is able to be performed by combining the available free capacity in the pre-allocated virtual memory with the available free capacity of the additionally allocated area,
wherein an optical link connection of the resource-centric network is managed based on each memory group which is implemented as a different piece of hardware and includes a physical I/O port that provides an interconnection interface.

10. The memory address allocation apparatus of claim 9, wherein the processor is configured to:
among memories corresponding to the virtual memory that is pre-allocated, determine whether an available memory for allocation of the memory area is connected, to an optical link, and
when the available memory is connected to the optical link, allocate the memory area to the available memory and transmit memory information changed based on allocation of the memory area.

11. The memory address allocation apparatus of claim 10, wherein the processor is further configured to, when the capacity of the optical link connected to the available memory is not sufficient to accommodate the new service, determine that the available memory is not connected to the optical link.

12. The memory address allocation apparatus of claim 10, wherein the processor is further configured to:

when the available memory is not connected to the optical link, set a new optical link to another available memory for allocation of the memory area among the memories corresponding to the virtual memory that is pre-allocated, allocate the memory area to the other available memory to which the new optical link is set, and transmit the new optical link and memory information changed based on allocation of the memory area to CPU, and when the new optical link to the available memory fails to be set, transmit a new service accommodation error signal.

13. The memory address allocation apparatus of claim 9, wherein the processor is configured to:

determine whether the new service is able to be accommodated by using the additionally allocated area and when the new service is not able to be accommodated by using the additionally allocated area, transmit a new service accommodation error signal, when the new service is able to be accommodated by using the additionally allocated area, determine whether an available memory that may allocate the memory area among memories corresponding to the additionally allocated area is connected to an optical link, and when the available memory is connected to the optical link, allocate the memory area to the available memory and transmit memory information changed based on allocation of the memory area.

14. The memory address allocation apparatus of claim 13, wherein the processor is further configured to, when the available memory is not connected to the optical link, set a new optical link to an available memory that may allocate the memory area among memories corresponding to the additionally allocated area, allocate the memory area to the available memory to which the new optical link is set, and transmit the new optical link and memory information changed based on allocation of the memory area.

* * * * *